United States Patent [19]
Sakamoto

[11] Patent Number: 5,243,246
[45] Date of Patent: Sep. 7, 1993

[54] CONNECTOR ASSEMBLY FOR A ROTARY ELECTRIC MACHINE

[75] Inventor: Masafumi Sakamoto, Kiryu, Japan
[73] Assignee: Japan Servo Co., Ltd., Tokyo, Japan
[21] Appl. No.: 894,737
[22] Filed: Jun. 5, 1992
[30] Foreign Application Priority Data
  Jun. 7, 1991 [JP] Japan .................. 3-051129[U]
[51] Int. Cl.⁵ .................................. H02K 1/00
[52] U.S. Cl. ........................ 310/179; 310/71; 310/182
[58] Field of Search .......... 310/179, 71, 40 R, 182, 310/203, 234

[56] References Cited
U.S. PATENT DOCUMENTS
  4,642,885  2/1987  King ........................... 310/71
  4,851,725  7/1989  Keck ........................... 310/71
  5,015,894  5/1991  Crow et al. .................. 310/71

FOREIGN PATENT DOCUMENTS
  62-107550  7/1987  Japan ......................... 310/179

Primary Examiner—Steven L. Stephan
Assistant Examiner—Matthew Nguyen
Attorney, Agent, or Firm—Oblon, Spivak, McClelland, Maier & Neustadt

[57] ABSTRACT

A connector assembly for a rotary electric machine which has a rotor fixed around a rotary shaft, a stator positioned around the outer periphery of the rotor and having a stator core clamped between a pair of insulators and a plurality of coils attached to the insulators. The rotary electric machine is further provided with a mounting section on one side of the insulator and a mounting block having a plurality of pins to be connected to successive terminal ends and starting ends of respective coils.

5 Claims, 4 Drawing Sheets

CONNECTOR ASSEMBLY FOR A ROTARY ELECTRIC MACHINE

BACKGROUND OF THE INVENTION

1. Field of the Invention

This invention, relates to a connector assembly for a rotary electric machine, especially to an improved connector assembly, connecting a terminal end of one coil end to the starting end of the next coil, one after another for connecting the conductor ends of each stator coils, with an intention to simplify the construction of the electric machine, to minimize the number of required parts and to make easier the assembly thereof, and finally to make possible an appreciable cost reduction.

2. Description of the Prior Art

There have been proposed small sized rotary electric machines constructed by laminating punched out silicon steel plates. In such types of electric machines, a stator which has a plurality of magnetic poles radially arranged at the interior of a ring shaped yoke is used, and each has windings onto the poles. The connector means, connects the terminal end of one coil winding to the starting end of the next, and thus such means of connection which connects all the winding of coils one after another, is an important key for cost reduction in manufacturing this type of rotary electric machine. A conventional connector assembly is formed by directly soldering lead wires to the junction between the above mentioned both ends. However another type of connector construction uses a plurality of pins for this purpose.

Here is given in explanation on such construction by referring to FIGS. 1 through 4.

FIG. 1 shows construction of a conventional Hybrid Type Stepping Motor. There is a rotary shaft 1, around which a rotor 3 is fixed. The rotor 3 consists of a permanent magnet 5 sandwiched between a pair of rotary elements 7, 7. Radially outside the aforesaid rotor 3, a stator 9 is located. The stator 9, as shown in more detail in the fragmented drawings of FIG. 3 and FIG. 4, is constructed by stator cores 11, which are placed between a pair of insulators 13 and 13 around which a plurality of coils 15 are wound. A plurality of conductive pins 17 are press fixed to one side (right side in FIG. 1) of the above-mentioned pair of insulators 13, 13 after having passed through a printed circuit board 19 mentioned hereunder. There is provided the printed circuit board (hereinafter called PCB) 19 as shown in FIG. 2. On the PCB 19, a specific number of conductive paths of designated conductive routes 21 are printed. Each of the circuit routes has a hole 23 at each end. The PCB constructed as explained above, is joined together at the right side of the stator as shown in FIG. 2. In other words, each pin 17 is inserted into the insulator 13 after it is passed through each hole 23. The terminal ends of one coil 15 and the starting end of another coil 15 are wound around the designated pin 17, then they are soldered.

Next, a connector 25 is jointed thereto. The connector 25 consists of two members 27 and 29. Through this connector 25, electric current can be supplied from any external power source. The member 29 is a pin, the base of which is fixed by soldering onto the circuit path of PCB 19.

PROBLEMS TO BE SOLVED BY THIS INVENTION

There has been a problem of complexity in the conventional connector and troublesome connecting work cannot be dispensed due to the fact that the conventional connector inevitably uses PCB 19 and connector 25 to energize the machine from the coil's 15 ends, they must be connected following a specified sequence.

SUMMARY OF THE INVENTION

An object of this invention is to provide an improved connector assembly to be incorporated in a rotary electric machine which does not have such problems or troublesome assembly as encountered in the prior art as explained above. In order to solve the above-mentioned problems, the rotary electric machine incorporating a connector assembly of the present invention comprises, a rotor fixed around a rotary shaft, a stator having a part of insulator plates which hold therebetween a stator core disposed around the rotor and further having a plurality of coils disposed around the insulators, a mounting section provided on one of said insulators, a mounting block detachably mounted on the mounting section having a plurality of pins, to each of which a terminal end of one coil and a starting end of the next coil is wound.

The mounting section mentioned above is formed as a flange extended from the top portion of the insulator beyond its upright side face and having a plurality of holes through each of which a pin is passed, thereby the mounting block can be fixed to the mounting section by passing the pins of the mounting block through these holes.

Alternatively, there is another modified structure which has a similar flange protruding from the insulator but having a plurality of grooves to which pins of the block are engaged for fixing the mounting block to the mounting section. A still further alternative mounting block is formed to have a pair of receptor arms protruded from the side portion of the insulator, between which receptor arms of the mounting block is inserted and fixed.

DESCRIPTION OF THE PREFERRED EMBODIMENTS

Figure 5:
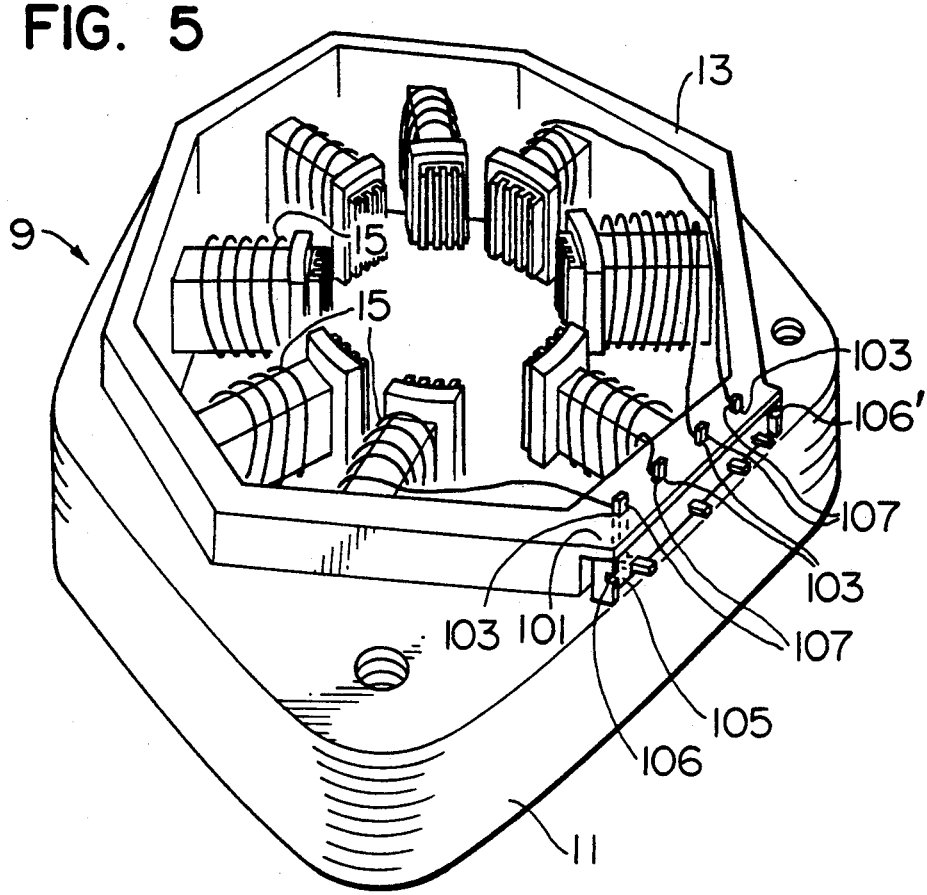
FIG. 5 is a perspective view showing a part of a rotary electric machine according to a first embodiment of the present invention.
Figure 6:
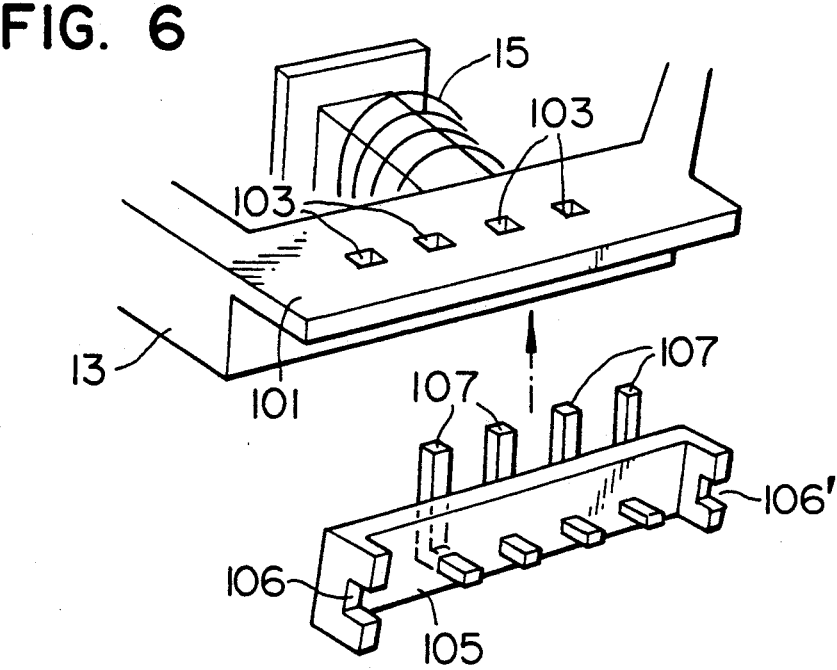
FIG. 6 is a fragmented and exploded perspective view of a first embodiment of the present invention showing a relationship between a mounting section formed as a flange and a mounting block.

With reference to FIG. 5 and FIG. 6, the first embodiment of this invention will be explained hereunder. Numerals or symbols the same as or similar to those shown in the prior art are designated with the same or similar ones in the drawings, and their explanation are not repeated. One of a pair of octagonal insulators 13 shown in FIG. 5 is extended outwardly at one side of the top face to form a flanged portion 101 and a plurality of holes 103 (4 holes in FIGS. 5 and 6), are formed, to form a mounting section. A "U" shaped mounting block 105 made of plastics is prepared. On the block 105, a plurality of conductive Pins 107 (4 pins in FIGS. 5 and 6) are mounted in alignment with each other. These pins 107 are all "L" shaped and are fixed to the block 105 with the top end of each upstanding arm projecting upwards beyond the upper face and its lower arm is outwardly extending normal to the upper arm.

Each end of the "U" shaped block 105 has a short leg normal to the body of the block, on each leg a recess 106 or 106' is formed, respectively.

The mounting block 105 as constructed above is placed and fixed under the flange 101, which flange constitutes a mounting section of the connector assembly of this invention. In other words, a fixing block, not shown, is inserted into each of recess 106 and 106'.

At the time of fixing, the upstanding arm of the pin 107 is passed through each hole 103 with its end portion being projected upward beyond the hole 103.

Figure 1:
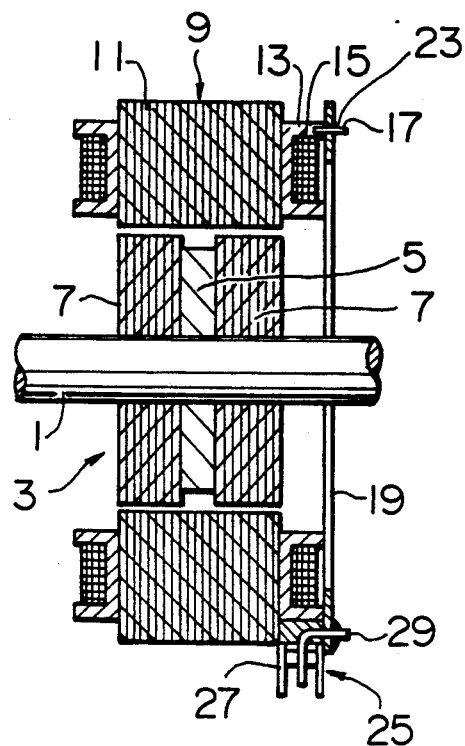
FIG. 1 is an elevation view showing a prior art rotary electric machine sectioned at different angles at upper and lower halves thereof along the center line to show the construction of the main part of the rotary electric machine.
Figure 2:
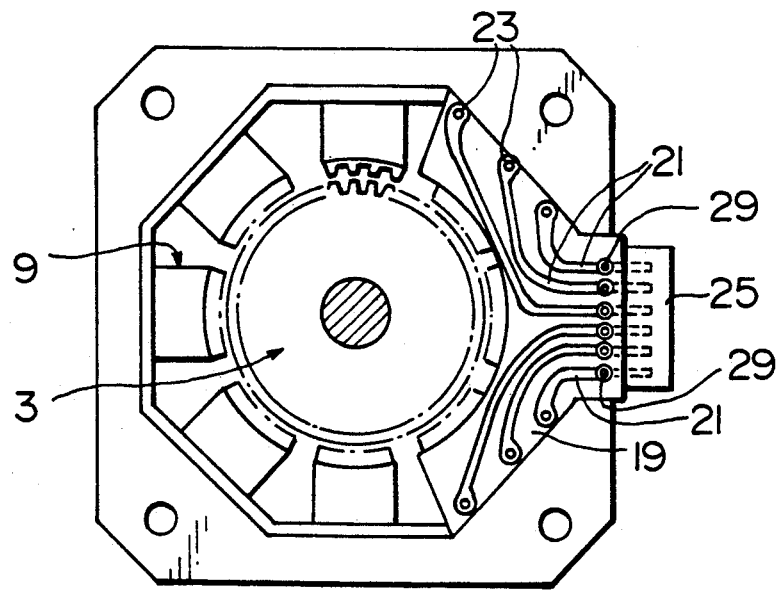
FIG. 2 is a plan view of the prior art rotary electric machine shown in FIG. 1.
Figure 3:
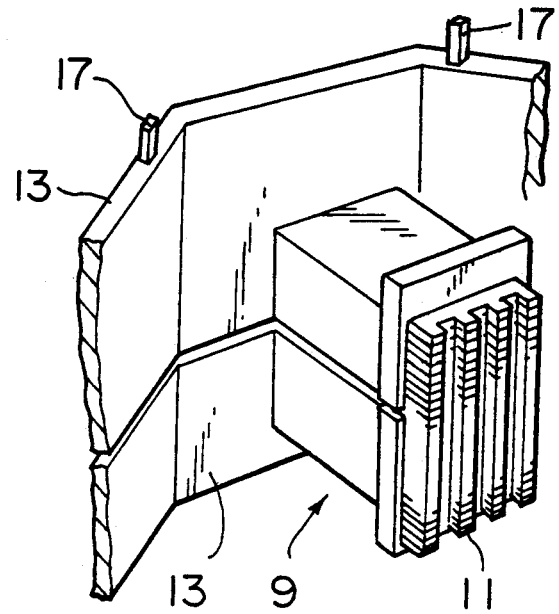
FIG. 3 is a fragmented perspective view in enlarged scale showing a part of a prior art rotary electric machine.
Figure 4:
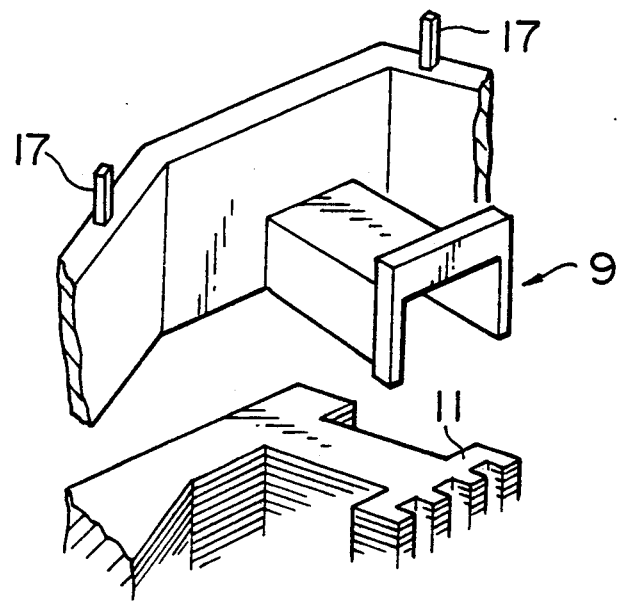
FIG. 4 is a fragmented and exploded perspective view showing a relation between the stator and the stator core of a prior art rotary electric machine.

Both the terminal, an end of one coil 15 and the starting end of the next coil 15 is wound around each projected pin 107, and then soldered together. Consequently the function of PCB 19, Pin 17 and connector 25 used in the prior art (shown in FIG. 1 and FIG. 2), can be replaced by using the above explained mounting block 105 alone.

Therefore, the connector means can be simplified in its structure, and the number of required parts can be reduced, and assembly work also can be simplified and finally the total cost also can be reduced. The pin 107 mounted on the mounting block 105 is not always required to be "L" shape, but straight pins are also acceptable.

When the mounting block 105 does not have such recesses 106, 106', the mounting block 105 may be formed by flexible materials such as vinyl instead of hard plastics, and the pins can be made of soft materials and shaped straight, and the mounting block 105 and pins are made as a single piece and then bent to "L" shape so as to be positioned and fixed into the holes 103 of the flanged mounting section 101. This alternative way of pin making is also acceptable to work the first embodiment of the present invention.

Figure 7:
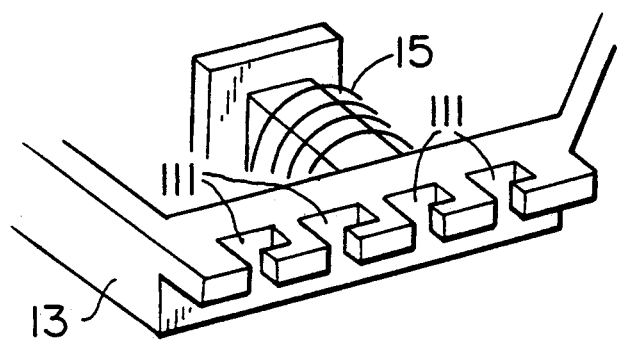
FIG. 7 is a perspective view of a flanged mounting section according to a second embodiment of the present invention.

Next, by referring to FIG. 7, a second embodiment of this invention will be explained hereunder. In this case, a modified shape of mounting section 101 having grooves 111 with cut-out portions is used. Instead of forming holes as shown in FIGS. 5 and 6, the mounting block 105 can be fixed to the flange shaped mounting section 101 by inserting it beneath the reverse side of the insulator 13. More specifically, FIG. 7 illustrates the grooves 111 having cut-out portions instead of forming holes 103 as shown in FIGS. 5 and 6 in order to allow the insertion of the block 105 as shown in FIG. 6. This means that the construction can allow widened manner of freedom in assembly.

Figure 8:
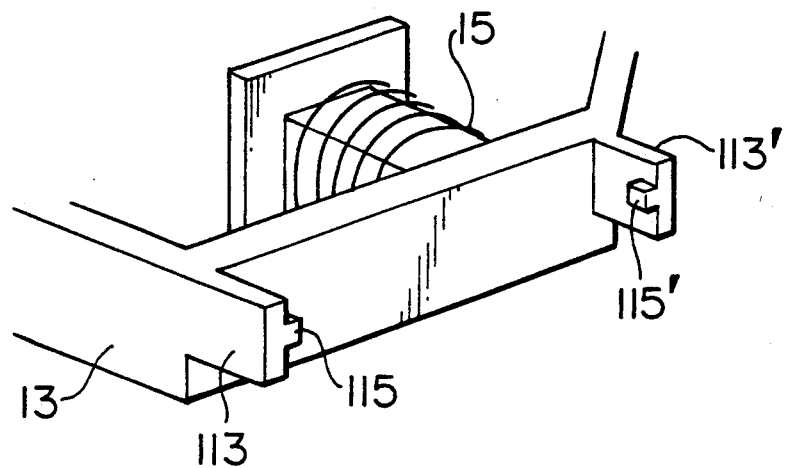
FIG. 8 is a perspective view of a receptor type mounting section according to a third embodiment of the present invention.

Next, by referring to FIG. 8, here is given an explanation with regard to a third embodiment of this invention. In this case, the insulator 13 is formed to have a pair of arm-like receptors 113 and 113', on each one of which an inwardly protruded stopper 115 and 115' opposing each other are formed at its inside face of the receptor, so that the mounting block 105 can be set by utilizing its cut recesses 106 and 106', then by slightly shifting the mounting block 105 toward the stopper, then the block 105 can be caught and held by the stoppers 115 and 115'.

As has been disclosed in the forgoing paragraphs, the insulator is formed to have a mounting section, while the mounting block to be mounted is formed to have a plurality of pins and is prepared as a discrete piece. At first, the mounting block is mounted and fixed to the mounting section, and under this fixed condition the pins on the mounting section can be used for connecting the leading end of the coil wire ends, then the desired connection can be effected to satisfy the required function.

This invention shall not be limited only to those shown and explained in the above-mentioned embodiments, and shapes of the mounting block and the mounting section also shall not be limited only to those shown in the drawings and the explanation mentioned above.

As described above in detail, all required function of electric connection are obtained, by employing the connector assembly of this invention, by means of mounting the mounting block to the mounting section positioned on one side of insulator of a rotary electric machine, the pins provided on the mounting block are used for fixing the mounting block to the insulator. As a result, connector assembly can be simplified in freedom of assembly, number of necessary parts, thereby the work of assembly also becomes easier, and finally cost reduction can be achieved.

What is claimed is:

1. A connector assembly for a rotary electric machine having a rotary shaft, comprising:
   a stator fixed around said rotary shaft, said stator having a stator core sandwiched between a pair of insulators and a plurality of wire wound coils wound around said insulators;
   a mounting section positioned on one side of one of said insulators, said mounting section outwardly extending from said one insulator in the form of a flanged portion and comprising a plurality of holes; and
   a mounting block detachably mounted to said mounting section, said mounting block comprising a plurality of pins for connection to a terminal end of one of said coils and to a starting end of another one of said coils, said pins being aligned with and extending through the plurality of holes of said mounting section for fixing said mounting block to said mounting section.

2. The connector assembly for a rotary electric machine as claimed in claim 1, wherein said mounting block is fabricated of a flexible material such as vinyl and the plurality of pins are of a flexible material so that said mounting block and pins can be flexibly attached to said mounting section as an integral member.

3. The connector assembly as claimed in claim 1, wherein said pins are L-shaped such that one section of each of said pins extend through said holes and the other section of each of said pins extend perpendicular to said one section of said pins.

4. A connector assembly for a rotary electric machine having a rotary shaft, comprising:
- a stator fixed around said rotary shaft, said stator having a stator core sandwiched between a pair of insulators and a plurality of wire wound coils wound around said insulators;
- a mounting section positioned on one side of one of said insulators, said mounting section outwardly extending from said one insulator in the form of a flanged portion and comprising a plurality of grooves having cut-out portions; and
- a mounting block detachably mounted to said mounting section, said mounting block comprising a plurality of pins for connection to a terminal end of one of said coils and to a starting end of another one of said coils, said pins engaging with each of the grooves of the mounting section for fixing said mounting block to said mounting section.

5. A connector assembly for a rotary electric machine having a rotary shaft, comprising:
- a stator fixed around said rotary shaft, said stator having a stator core sandwiched between a pair of insulators and a plurality of wire wound coils wound around said insulators;
- a mounting section positioned on one side of one of said insulators, said mounting section comprising a pair of oppositely disposed receptor arms extending from said one insulator, each of said receptor arms comprising an inwardly extending protrusion; and
- a mounting block detachably mounted to said mounting section, said mounting block having opposite ends which each comprise leg portions having recesses which cooperate with the protrusions of the receptor arms of the mounting section for fixing the mounting block to the mounting section, said mounting block further having a plurality of pins for connection to a terminal end of one of said coils and to a starting end of another one of said coils.

* * * * *